United States Patent [19]

Reeves

[11] Patent Number: 4,858,645
[45] Date of Patent: Aug. 22, 1989

[54] LUBRICANT DELIVERY SYSTEM INCLUDING FLOW MEASURING

[75] Inventor: Gordon P. Reeves, Grandville, Mich.

[73] Assignee: G. P. Reeves In., Grand Rapids, Mich.

[21] Appl. No.: 261,776

[22] Filed: Oct. 24, 1988

[51] Int. Cl.[4] .................. F16N 13/16; F04B 49/00
[52] U.S. Cl. ................................. 137/551; 137/566; 417/43; 417/46; 184/29
[58] Field of Search ............... 137/566, 551; 417/43, 417/46; 184/29

[56] References Cited

U.S. PATENT DOCUMENTS

| | | | |
|---|---|---|---|
| 2,550,093 | 4/1951 | Smith | 417/43 |
| 3,247,798 | 4/1966 | Glasgow et al. | 417/43 X |
| 3,421,600 | 1/1969 | Gleason et al. | 417/399 X |
| 3,854,846 | 12/1974 | Douglas | 417/43 X |
| 3,918,843 | 11/1975 | Douglas et al. | 417/43 X |
| 3,926,279 | 12/1975 | Thrasher | 184/29 |
| 4,324,316 | 4/1982 | Thrasher, Jr. et al. | 184/29 |
| 4,507,053 | 3/1985 | Frizzel | 417/43 |

FOREIGN PATENT DOCUMENTS 2238799 2/1984 Fed. Rep. of Germany ........ 417/43

Primary Examiner—John Rivell
Attorney, Agent, or Firm—Price, Heneveld, Cooper, DeWitt & Litton

[57] ABSTRACT

A lubricating delivery system includes a positive displacement lubricant pump and fluid flow measuring means for monitoring the output of the pump. The pump is a miniature injection pump and the measuring means includes switch means responsive to movement of the check valve provided at the output of such a pump. Because such a system provides flow measurement by a single digital input to a programmable controller, numerous pumps may be utilized to individually supply lubricant to separate portions of a machine and all may be monitored for output flow without tying up an inordinate portion of the PC input circuitry, which is typically required to additionally control the machine being lubricated.

12 Claims, 2 Drawing Sheets

LUBRICANT DELIVERY SYSTEM INCLUDING FLOW MEASURING

BACKGROUND OF THE INVENTION

This invention relates to the delivery of lubricant to portions of a machine requiring lubrication and in particular to the measured flow of lubricant from a miniature positive displacement lubricant pump of the type that may be grouped into a lubrication system adapted to delivering metered volumetric quantity of lubricant separately to distinct portions of a machine.

An injection type of positive displacement metering pump is known in the art for providing reliable lubrication to individual portions of a machine, such as pneumatic cylinders, valves, bearings and the like. Such a pump is actuated by pulses of air and delivers a known volumetric quantity of lubricant for each actuating pulse. In this manner, the rate of lubricant delivery can be controlled by controlling the frequency of the actuating pulses. This direct relationship between frequency of actuation and rate of lubricant delivery will not be valid, however, if the supply of lubricant to the pump is interrupted, such as by an air pocket in the lubricant supply line, even minute air pockets in the lubricant may cause the amount of lubricant delivered by the pump to be less than the anticipated amount.

While slow measuring devices for pipe lines are known, such devices are relatively complex and typically provide either analog output signals or parallel digital output signals. Such analog and parallel digital signals require a significant amount of dedicated input circuitry for interface with a programmable controller. Because the input circuitry provided with a standard programmable controller is limited and typically is additionally assigned to the control of the machine being lubricated, the use of conventional flow measuring devices to individually monitor the volumetric quantities of lubricant flowing to numerous portions of a machine from individual positive displacement pumps would require an inordinately large amount of programmable controller input circuitry.

SUMMARY OF THE INVENTION

The present invention overcomes the difficulties of the prior art by providing a lubricating system capable of monitoring lubricant flow to each of multiple, separately-supplied portions of a machine while requiring a single digital input port of a programmable controller for each lubricant line so monitored. The present invention is, accordingly, capable of individually monitoring an extensive number of such lubricant supply lines without appropriating an inordinate amount of the input circuitry of the programmable controller which is typically provided for the purpose of supplying all control requirements for a particular machine, not just those of the lubricant supply system.

The present invention is intended for use with a miniature positive displacement pump having a pumping member reciprocally movable through a metering passage for positively volumetrically displacing a quantity of lubricant in response to reciprocation of the pumping member and a check valve having a valve body which reciprocates with respect to a valve seat to cause unidirectional flow of the lubricant from the pump. The present invention provides measuring means for measuring the flow of lubricant from the pump by providing monitoring means for monitoring the movement of the check valve body. If the check valve body is moved a predetermined distance in response to displacement of lubricant by the pumping member, this occurrence is counted. If, however, an air pocket is encountered by the pump with the supply of lubricant and the check valve body fails to move the predetermined distance, then it will be concluded that the pump failed to produce a positive displacement of lubricant from the pump. Therefore, although the pumping member is reciprocally moved, the measuring means does not treat that movement as having produced positive displacement of lubricant. Because the volumetric amount of lubricant positively displaced by each successful movement of the pumping member is known, the rate of lubricant displaced by the pump, i.e., the lubricant flow rate, may be determined by counting the occurrences determined by the monitoring means. The output of the measuring means may be processed by a programmable controller in order to adjust the means for actuating the respective positive displacement pump in order to ensure that a desired lubricant flow rate is maintained from each pump.

These and other related objects, advantages and features of this invention will become apparent upon review of the following specification in conjunction with the drawings.

DETAILED DESCRIPTION OF THE PREFERRED EMBODIMENT

Referring now specifically to the drawings, and the illustrated embodiments depicted therein, a positive displacement lubricant pump and flow measuring system generally shown at 10 includes an air-actuated positive displacement lubricant pump 12 and flow measuring means generally shown at 14.

In the illustrated embodiment, positive) displacement lubricant pump 12 is described in detail in U.S. Pat. No. 3,421,600, the disclosure of which is hereby incorporated herein by reference. Nonetheless, to facilitate the understanding of the invention, a brief description of the lubricant pump follows.

Figure 2:
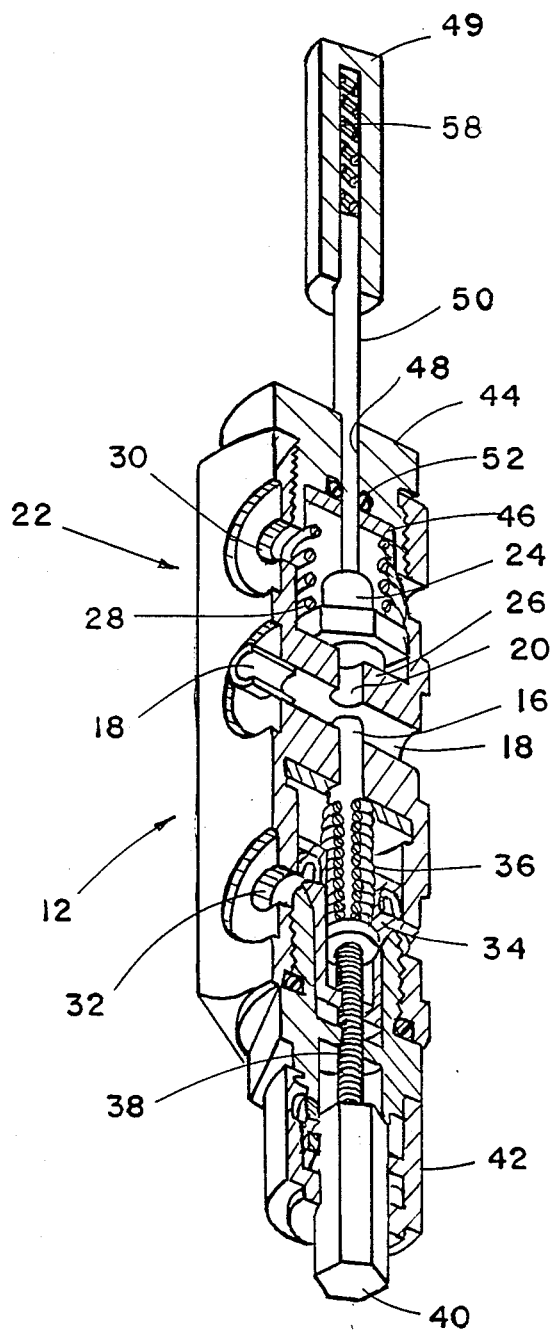
FIG. 2 is a perspective view of a positive displacement pump modified according to the present invention.

Lubricant pump 12, as illustrated in FIG. 2, includes a pumping member 16 reciprocable within a housing cooperative with a transverse lubricant supply passage 18 and through a bore 20. Bore 20, which is axially aligned with pumping member 16, provides a lubricant metering chamber. Forward reciprocation of pumping member 16 will serve to push a discrete and precise amount of lubricant from passage 18 outwardly through the metering chamber 20.

Lubricant pump 12 further includes a spring bias check valve 22 having a hexagonally-shaped check body 24 reciprocable with respect to a check seat 26, which is defined by the output opening of lubricant metering chamber 20. Check body 24 is biased against check seat 26 by a check spring 28. The forward reciprocation of pumping 30 member 16 pushing a discrete amount of lubricant from metering chamber 20 will move check body 24 from seat 26 to allow the lubricant to pass around the check body to a lubricant delivery passage 30, after which the check spring 28 will return the check body 24 to engagement with check seat 26. The purpose of check valve 22 is to provide unidirectional flow of lubricant to delivery passage 30.

Pumping member 16 in the lubricant pump is actuated by pulses of fluid pressure, for example compressed air or other such gas, from actuating gas inlet 32, such pulses of actuating fluid entering into the pump housing to act against a piston portion 34 to drive the latter axially in response to pressurized air behind the piston portion. A return spring 36 loads the opposite side of piston 34 to return it to its original position, withdrawing pumping member 16 from the metering chamber 20 after each actuating pulse. Preferably, the pump also includes a threaded stem 38 having an end actuating member 40 attached thereto, by which the pumping member 16 may be reciprocated by manual pressure. A collar 42, which limits the outward excursion of the end of member 40, and thus of the pumping member 16, can be used to vary the amount of fluid discharged by the lubricating pump upon each forward actuation of the pumping member 16, in a known manner, by changing the position of the forward end of pumping member 16 with respect to penetration thereof and to the transverse lubricant supply passage 18 and the metering chamber 20.

Check valve 22 is retained in operative association with the metering chamber by a check retainer 44 acting through an intervening washer 46. A central bore 48, which is axially aligned with metering chamber 20, is defined in check retainer 44. A stem 50 protrudes from the pump housing through bore 48 and includes an inner end portion attached to check body 24. An 0-ring 52 provides a fluid seal between stem 50 and lubricant delivery passage 30.

Figure 1:
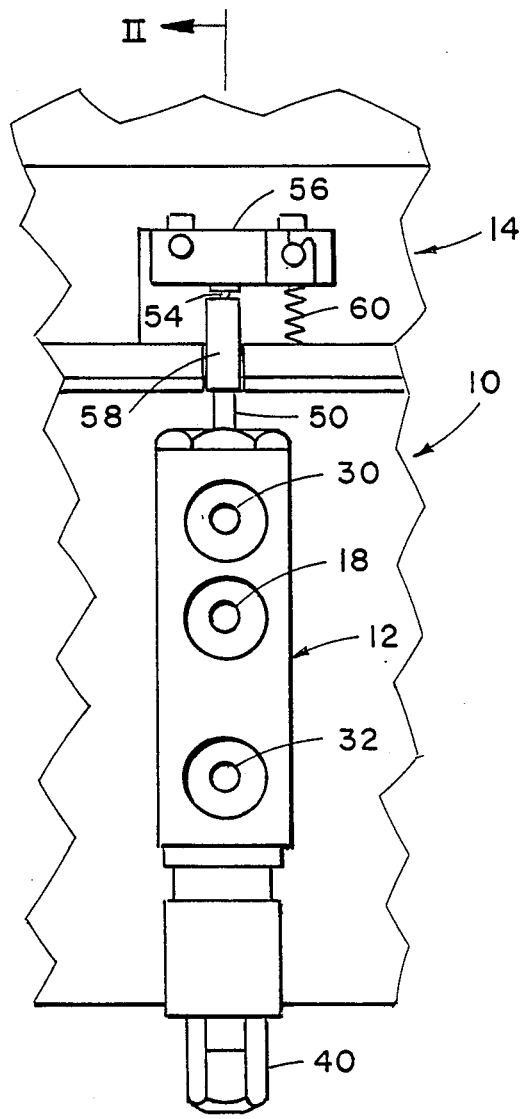
FIG. 1 is a side view of a pump and flow rate measuring means according to the present invention.

An external end portion of stem 50 engages an actuating member 54 of a mechanical switch 56 (FIG. 1). The outer end portion 49 of stem 50 includes an overtravel spring device 58 to prevent damage to switch 56 as a result of excessive axial movement of stem 50. In the illustrated embodiment, switch 56 is a microswitch which may be actuated by a slight amount of travel by actuating member 54. An adjusting screw 60 provides relative adjustable positioning between the switch actuating member 54 and lubricating pump 12 so that the switch may be properly actuated by the axial movement of check body 24 in response to a discrete quantity of lubricant being displaced by pumping member 16. Likewise, by a proper adjustment of adjusting screw 60, the relative position between the microswitch and the pump may be adjusted so that either no movement of check body 24 or a movement below a desired threshold will not cause the actuation of switch 56. In the manner, switch 56 will be actuated only upon the discharge of a predetermined quantity of lubricant from pump 12.

Figure 3:
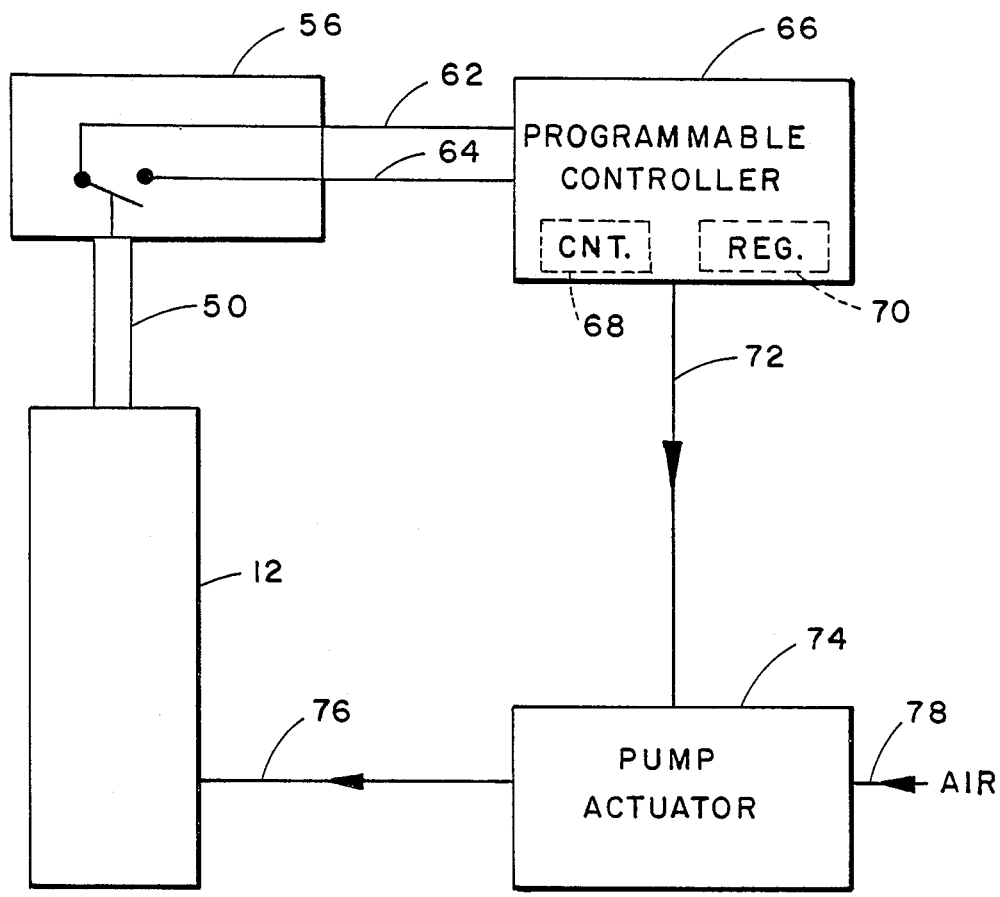
FIG. 3 is a block diagram of a fluid delivery system according to the present invention.

Referring now to FIG. 3, which illustrates control means for one positive displacement pump 12 of an entire fluid delivery system, switch 56 is illustrated as a normally open switch connected through input lines 62 and 64 to programmable controller 56. Input lines 62 and 64 constitute one digital input port of programmable controller 56 and will typically constitute one of the lines 62, 64 being connected to a source of voltage, such as 120-volts AC or a DC voltage level, with the other input line connected to a sense circuit that converts the presence and absence of voltage on the associated input line to a binary signal compatible with the logic circuits within to the programmable controller. Programmable controller 66 provides logic circuitry including counter 6 and register 70 to monitor the number and frequency of binary pulses presented to the programable controller in a manner that is well known in the art. An output line 72 from programmable controller 66 may control the actuation of a pump actuator 74 which, in turn, controls the number and frequency of air pulses provided on pneumatic line 76 to gas inlet 32 of lubricating pump 12. Pump actuator 74 may constitute a solenoid operated valve connected between a source of air 78 and pneumatic line 76. With the lubricant delivery system in FIG. 3, the programmable controller 66 may compare the frequency of the changes of the voltage level on input line 62 and 64 with a desired quantity initiated into a memory portion of the controller and adjust the frequency of actuating pulses on line 72 to cause lubricating pump 12 to make-up for any interruption in the delivery of lubricant from the pump 12. In this manner, the illustrated system compensates for air pockets in the lubricant supply line in order to provide positive assurance that the desired volumetric quantity of lubricant is provided to the respective portion of the machine. The system may also include alarms to indicate to an operator when a significant interruption in lubricant flow cannot be compensated for within a predetermined period of time. FIG. 3 is illustrative of on valve 12 and switch 56 connected to controller 66 and actuator 74. In practice, many such valves and switches would be connected on individual input ports of programmable controller 66 and supplied by output ports from pump actuator 74.

Changes and modifications in the specifically described embodiments can be carried out without departing from the principals of the invention. For example, although the monitoring switch is illustrated as a mechanical switch actuated by a stem extending to the check body, other switch and actuating schemes would be apparent to one skilled in the art. For example, a magnet positioned on the check body could alternatively provide actuating means for a read switch or Hall effect device. All such variations are encompassed within the invention which is intended to be limited only by the scope of the appended claims, as interpreted according to the principals of patent law, including the doctrine of equivalents.

The embodiments of the invention in which an exclusive property or privilege is claimed are defined as follows:

1. A lubrication system for delivering metered volumetric quantity of lubricant separately to distinct portions of a machine comprising:
 a plurality of positive displacement pumps, each of said pumps having a lubricant inlet configured for connection to a supply of a lubricant, a lubricant outlet adapted to delivering lubricant to a portion of a machine, a positive displacement pumping member reciprocally movable through a metering passage means cooperative therewith for positively volumetrically displacing a quantity of lubricant in response to reciprocation of said member, actuating means for reciprocating said member, and check valve means including a valve body movable from a seat for allowing lubricant flow from said passage to said outlet and movable toward said seat for preventing lubricant flow from said outlet to said passage; and lubricant flow measuring means for measuring the flow of lubricant from the fluid outlet of each of said pumps, said flow measuring means including monitoring means for monitoring the occurrence of each said check valve body moving away from and toward the associated said seat to indicate each reciprocal movement of a pumping member and the resulting delivery of a predetermined volume of fluid to a portion of a machine.

2. The lubrication system in claim 1 in which said monitoring means includes switch means associated with each of said pumps and an actuating means disposed between each said valve body and the respective said switch means for actuating said switch means.

3. The lubrication system in claim 2 in which each said switch means is a mechanical switch and each said actuating means includes a stem extending between the respective said valve body and mechanical switch.

4. The lubrication system in claim 3 in which each said valve body and associated stem are reciprocally 5. The lubrication system in claim 4 in which each said valve body is reciprocally movable coaxially with the respective said pumping member.

6. The lubrication system in claim 1 in which said measuring means further includes counting means for counting each said occurrence.

7. In a lubrication system for delivering a metered volumetric quantity of lubricant to a machine including a positive displacement pump having a fluid inlet configured for connection to a supply of a lubricant, a fluid outlet adapted to delivering lubricant to a machine, a positive displacement pumping member reciprocally movable through a metering passage means cooperative therewith for positively volumetrically displacing a quantity of said lubricant in response to reciprocation of said member, actuating means for reciprocating said member, and check valve means including a valve body movable away from a seat for allowing lubricant flow from said passage to said outlet and movable toward said seat for preventing lubricant flow from said outlet to said passage, the improvement comprising:

switch means associated with said pump for producing a digital output capable of assuming one of two states and actuating means connected with said check valve body for causing said switch means output to change states.

8. The lubrication system in claim 7 in which said switch means is a mechanical switch and said actuating means includes a stem extending between said valve body and said mechanical switch.

9. The lubrication system in claim 8 in which said valve body and said stem are reciprocally movable.

10. The lubrication system in claim 9 in which said valve body is reciprocally movable coaxially with said pumping member.

11. The lubrication system in claim 7 further including counting means for counting the changes of state of said digital output.

12. The lubrication system in claim 11 further including control means responsive to said counting means for controlling said actuating means.

* * * * *

UNITED STATES PATENT AND TRADEMARK OFFICE
CERTIFICATE OF CORRECTION

PATENT NO. : 4,858,645
DATED : August 22, 1989
INVENTOR(S) : Gordon P. Reeves It is certified that error appears in the above-identified patent and that said Letters Patent is hereby corrected as shown below:

Column 2, line 46:

After "positive" delete ")".

Column 2, line 67:

Delete "30".

Column 4, line 5:

"6" should be --68--.

Column 4, line 29:

"on" should be --one--.

Column 4, line 66:

After "movable" insert --away--.

Column 5, line 22:

After "reciprocally" insert --movable.--

Signed and Sealed this

Fourteenth Day of May, 1991

Attest:

*Attesting Officer*

HARRY F. MANBECK, JR.

*Commissioner of Patents and Trademarks*